United States Patent [19]

Ito et al.

[11] Patent Number: 4,870,581

[45] Date of Patent: Sep. 26, 1989

[54] ELECTRONICALLY CONTROLLED AUTOMATIC TRANSMISSION

[75] Inventors: Yasunobu Ito; Kenji Suzuki; Miki Nobuaki, all of Anjo, Japan

[73] Assignee: Aisin-Warner Kabushiki Kaisha, Aichi, Japan

[21] Appl. No.: 83,394

[22] Filed: Aug. 10, 1987

[30] Foreign Application Priority Data

Aug. 20, 1986 [JP] Japan .................. 61-194153

[51] Int. Cl.4 ............... B60K 41/08; G05D 13/02; G05D 17/02
[52] U.S. Cl. ........................ 364/424.1; 74/866; 74/867
[58] Field of Search ............ 364/424.1; 74/867, 868, 74/866

[56] References Cited

U.S. PATENT DOCUMENTS

| | | | |
|---|---|---|---|
| 4,667,540 | 5/1987 | Yagi | 74/867 |
| 4,691,285 | 9/1987 | Takeda | 364/424.1 |
| 4,698,763 | 10/1987 | Smyth | 364/424.1 |
| 4,707,789 | 11/1987 | Downs et al. | 74/867 |
| 4,710,879 | 12/1987 | Vahabzadeh | 364/424.1 |
| 4,742,461 | 5/1988 | Eschrich et al. | 74/867 |

FOREIGN PATENT DOCUMENTS 61-88059 5/1986 Japan.

Primary Examiner—Parshotam S. Lall
Assistant Examiner—Christopher L. Makay
Attorney, Agent, or Firm—Varndell Legal Group

[57] ABSTRACT

A sensed shift time and a standard value of shift time set for this shift are compared. If the result of the comparison is that the shift time does not fall within an allowable range of standard values, a signal outputted to a linear solenoid is varied in such a manner that the shift time will be held with the range of the standard values. Accordingly, actual shift time while a vehicle is traveling is constantly fed back and controlled so as to attain an optimum shift time. Therefore, even if a change in the shift time is brought about by a change in oil temperature in the transmission or by aging of friction elements or the like, the shift time can be corrected to an optimum value to improve shift sensation as well as the durability of the friction elements.

4 Claims, 7 Drawing Sheets

FIG. 8

| SHIFT POSITION | | SOLENOID | | | | CLUTCH | | | | BRAKE | | | | ONE WAY CLUTCH | | | |
|---|---|---|---|---|---|---|---|---|---|---|---|---|---|---|---|---|---|
| | | S₁ | S₂ | S₃ | S₄ | C₀ | C₁ | C₂ | C₃ | B₁ | B₂ | B₃ | B₄ | F₀ | F₁ | F₂ | F₃ |
| P | | × | ○ | × | | | | | | | | | ○ | | | | |
| R | STOP | × | ○ | × | | | ○ | | | | | ○ | ○ | | | | |
| | RUN | ○ | ○ | × | | | ○ | | | | | × | ○ | | | | |
| N | | × | ○ | × | | | | | | | | | ○ | | | | |
| D | IDLE | × | ○ | ○ | | | △ | | | ○ | | | ○ | | | | |
| | 1ST | × | ○ | × | | | ○ | | | | | | ○ | | | ○ | ○ |
| | 2ND | ○ | ○ | × | ◎ | | ○ | | | | ○ | | ○ | | ○ | | ○ |
| | 3RD | ○ | × | × | ◎ | | ○ | ○ | | | ○ | | | | ○ | | |
| | 4TH | × | × | × | ◎ | ○ | ○ | ○ | | | ○ | | | | | | |
| | 5TH | × | × | ○ | ◎ | ○ | | ○ | | ○ | ○ | | | ○ | | | |
| 3 | 1ST | × | ○ | × | | | ○ | | | | | | ○ | | | ○ | ○ |
| | 2ND | ○ | ○ | × | ◎ | | ○ | | | | ○ | | ○ | | ○ | | ○ |
| | 3RD | × | × | × | ◎ | ○ | ○ | | | | ○ | | | | | | ○ |
| | 4TH | × | × | ○ | ◎ | ○ | | | | ○ | ○ | | ○ | ○ | | | ○ |
| 2 | 1ST | × | ○ | × | | | ○ | | | | | ○ | ○ | | | ○ | ○ |
| | 2ND | × | × | × | | | ○ | ○ | | | ○ | | | | | ○ | |
| | (2ND) | ○ | ○ | × | | | ○ | | | ○ | ○ | | ○ | | ○ | | ○ |
| | (3RD) | ○ | × | × | | | ○ | | ○ | ○ | ○ | | | | ○ | | |
| 1 | 1ST | × | ○ | × | | | ○ | | | | | ○ | ○ | | | ○ | ○ |
| | (2ND) | × | × | × | | | ○ | ○ | | | ○ | | | | | ○ | |
| | (3RD) | ○ | × | × | | | ○ | ○ | ○ | ○ | | | | | ○ | | |

| NOTES | | |
|---|---|---|
| ○ | ON | ENGAGE |
| × | OFF | RELEASE |
| ◎ | L-UP ENGAGEABLE | |
| △ | | DEPRESSURIZE |

ELECTRONICALLY CONTROLLED AUTOMATIC TRANSMISSION

BACKGROUND OF THE INVENTION

This invention relates to an electronically controlled automatic transmission in which the time of a shift is automatically adjusted so as to always be held within a set optimum shift time.

In both hydraulically controlled automatic transmissions and electronically controlled automatic transmissions, the time of a shift is decided by such factors as the volume of the chamber of the friction elements [(amount of stroke)×(area)], orifice diameter for deciding flow rate when oil is applied to the friction elements, and accumulator spring pressure for deciding the slope of hydraulic pressure rise at engagement. Furthermore, since the time of a shift is also influenced by the transmitted torque, the abovementioned parameters are set to respective optimum values in accordance with the engine of the vehicle. Moreover, even if the set values are the same, each of the parameters includes a significant dispersion element. By adopting a method in which the tolerance of orifice diameter is strictly controlled or in which separator plates are selected and assembled from among plates having plural varieties of thicknesses, the time of a shift is held within standards to assure the appropriate shift sensation and durability of the friction elements.

In order to assure an appropriate shift sensation and the durability of the friction elements in the above-described conventional method, manufacturing tolerance is strictly controlled or the amount of stroke is adjusted by selective assembly in the manufacturing process. As a result, the manufacturing process is complicated and the costs involved are high. Moreover, even if the shift time falls within standards due the aforementioned adjustment at the time of manufacture, the shift time may change due to the temperature of the oil in the transmission or the aging of the friction elements. This can have a deleterious effect upon shift sensation and reduce the durability of the friction elements. There are no means for dealing with these problems in the prior art.

SUMMARY OF THE INVENTION

Accordingly, an object of the present invention is to provide an electronically controlled automatic transmission in which shift time is automatically adjusted so as to always be held within a set time, whereby shift sensation and the durability of the friction elements are improved.

According to the present invention, the foregoing object is attained by providing an electronically controlled automatic transmission having a throttle opening sensor in which a signal from the throttle opening sensor is outputted to a linear solenoid, thereby controlling a linear solenoid valve in a hydraulic circuit and regulating throttle pressure and line pressure, characterized by having shift time sensing means and preset shift time standard value data, wherein data outputted to the linear solenoid are altered when a sensed shift time lies outside an allowable range of shift time standard values.

Thus, in accordance with the invention, a sensed shift time and a standard value of shift time set for this shift are compared. The present invention includes computing a gear ratio during a shift from input and output rpm's of an automatic transmission. A shift time is computed by comparing a present gear ratio with gear ratios before and after the shift. Further, the present invention provides a control by computing the gear ratio from the input and output rpm's of the automatic transmission on a real-time basis at all times when a shift is made, without relying upon an assumption or shift decision. If the result of the comparison is that the shift time does not fall within the allowable range of standard values, the signal outputted to the linear solenoid is varied in such a manner that the shift time will be held with the range of standard values. Accordingly, actual shift time while the vehicle is traveling is constantly fed back and controlled so as to attain an optimum shift time. Therefore, even if a change in the shift time is brought about by a change in oil temperature in the transmission or by aging of the friction elements or the like, the shift time can be corrected to an optimum value to improve shift sensation as well as the durability of the friction elements. In addition, an adjustment operation during the manufacturing process can be simplified or eliminated, thereby enabling the manufacturing costs to be reduced.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 8 is a view for describing the operation of the automatic transmission shown in FIG. 6.

DESCRIPTION OF THE PREFERRED EMBODIMENT

A preferred embodiment of the invention will now be described with reference to the drawings.

One example of an automatic transmission to which the present invention is applied will now be described.

Figure 6:
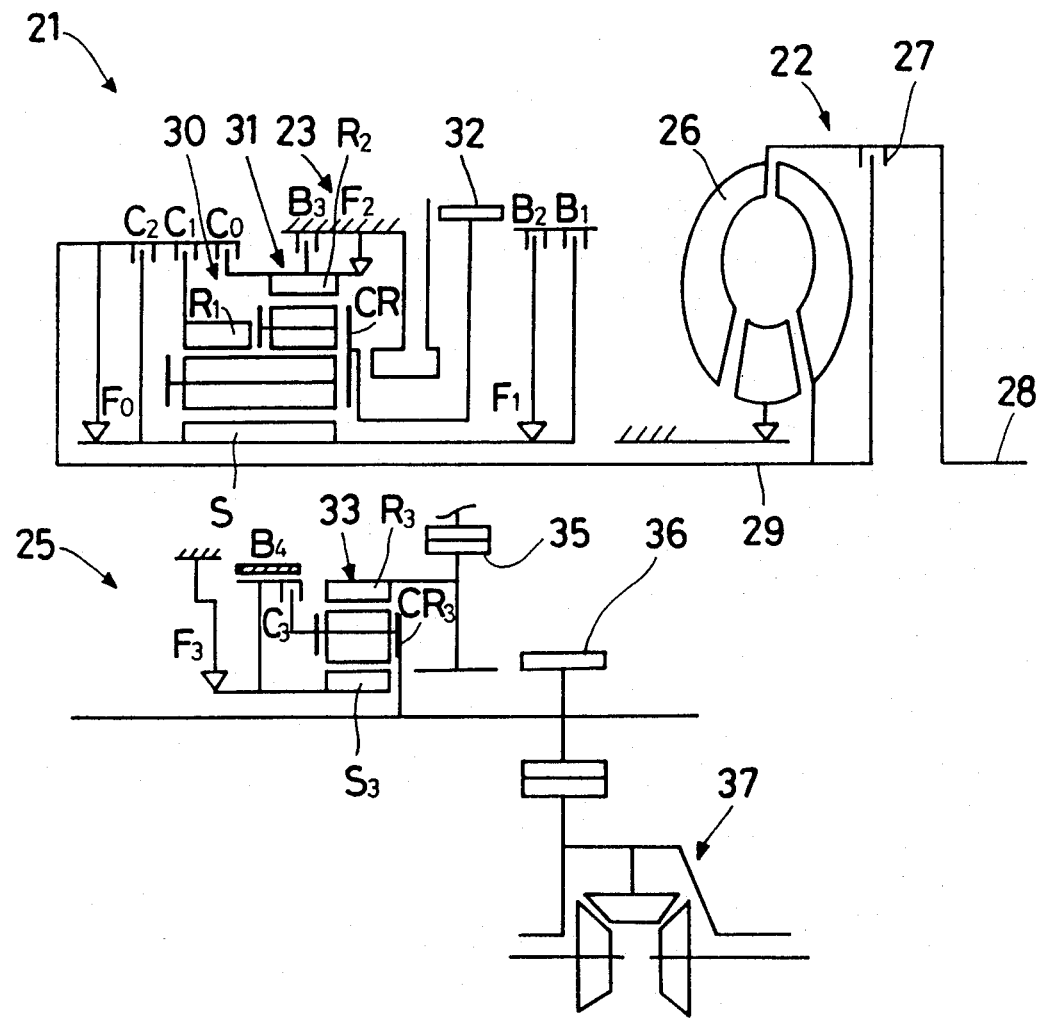
FIG. 6 is a schematic view illustrating a drive system of an automatic transmission to which the present invention is applied.

FIG. 6 is a schematic view illustrating the drive system of the automatic transmission. An automatic transmission 21 comprises a torque converter section 22, a five-speed automatic transmission mechanism 23 constituting the main transmission mechanism, and an underdrive mechanism constituting an auxiliary transmission mechanism.

The torque converter section 22 has a tongue converter 26 and a lock-up clutch 27. By engaging or disengaging the lock-up clutch 27, the rotation of an engine crankshaft 28 is transmitted to an input shaft 29 directly or through a torque converter 26.

The five-speed automatic transmission mechanism 23 includes a single planetary gear unit 30 and a dual planetary gear unit 31. Carriers CR of the two planetary gear units are integrated and so are sun gears S of the two units. The input shaft 29 is coupled to a ring gear R1 of the single planetary gear unit via a first clutch C1 and to the sun gear S via a second clutch C2. The sun gear S is braked directly by a first brake B1 and has its rotation in one direction limited by a second brake B2 via a first one-way clutch F1. A ring gear R2 of the dual planetary gear unit 31 is braked directly by a third brake B3 and has its rotation in one direction limited by a third brake B3 via a second one-way clutch F2. The input shaft 29 is coupled to the ring gear R2 of the dual planetary gear unit 31 via a third clutch C0. Interposed between the input shaft 29 and the sun gear S is a third one-way clutch F0 which limits the rotation of the sun gear S in such a manner that it will not surpass the rotation of the input shaft 29. The carrier CR is coupled to a counter-drive gear 32, which serves as the output gear of the five-speed automatic transmission mechanism 23.

The under-drive mechanism 25 comprises a single planetary unit 33 having a ring gear R3 coupled to a counter-driven gear meshing with the counter-drive gear 32, as well as a carrier CR3 coupled to an output pinion 36. A sun gear S3 has is rotation in one direction limited by a fourth one-way clutch F3. The sun gear S3 is braked by a fourth brake B4 and coupled to the carrier CR3 via a clutch C3. The output pinion 36 is coupled to a differential mechanism 37.

Figure 7:
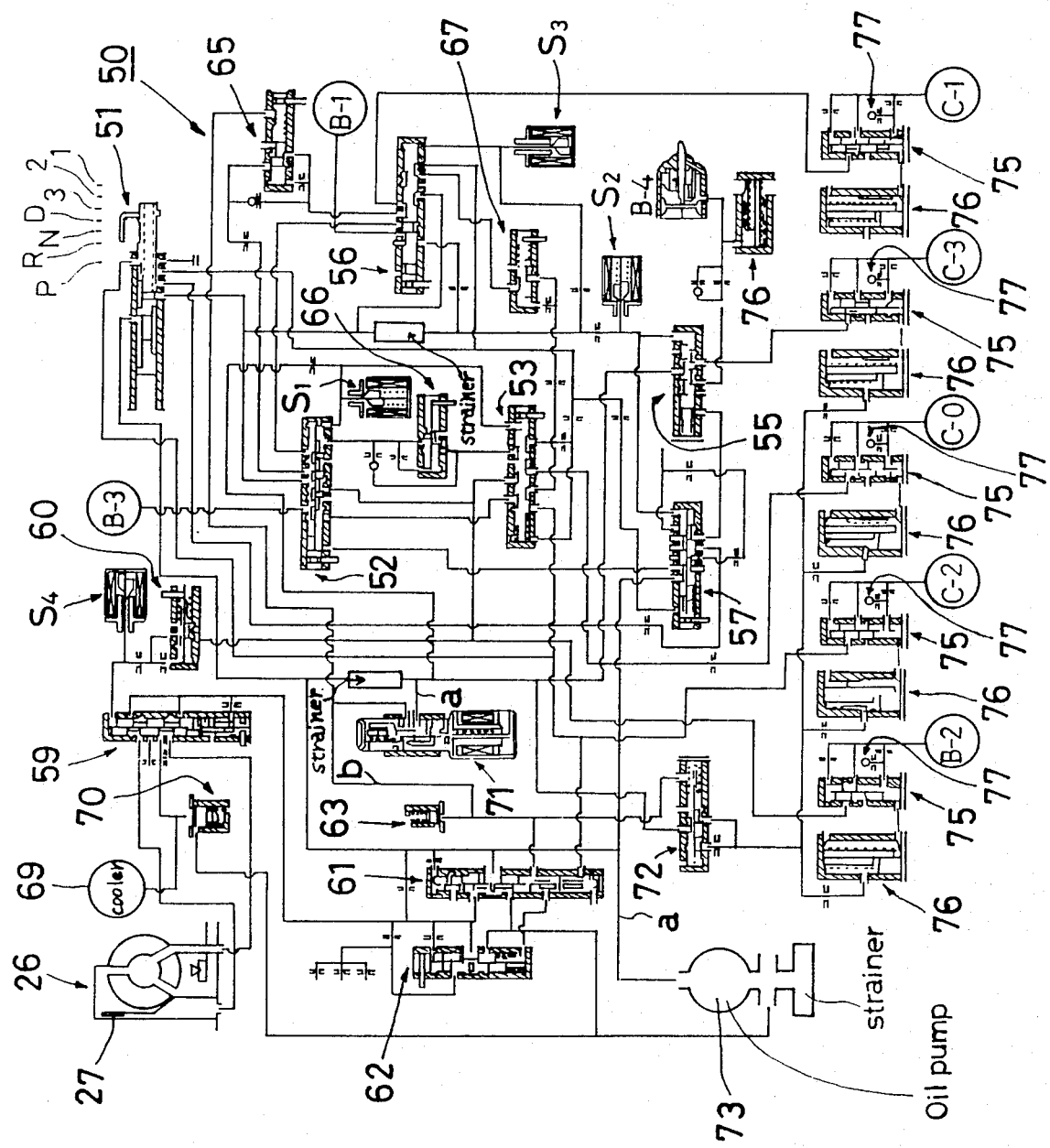
FIG. 7 is a hydraulic circuit of the automatic transmission shown in FIG. 6.

The above-described five-speed automatic transmission is controlled by a hydraulic circuit 50 shown in FIG. 7.

The hydraulic circuit shown in FIG. 7 includes a torque converter 26, a lock-up clutch 27, hydraulic servos C-0, C-1, C-2 and C-3 of the clutches shown in FIG. 6, hydraulic servos B-1, B-2, B-3 and B-4 of the respective brakes, a manual valve 51, a 1-2 shift valve 52, a 3-4 shift valve 53, a 2-3 shift valve 55, a 4-5 shift valve 56, a downshift control valve 57, a lock-up control valve 59, a lock-up modulator valve 60, a primary regulator valve 61, a secondary regulator valve 62, a pressure relief valve 63, a C-1 modulator valve 65, a 2nd modulator valve 66, a low modulator valve 67, a cooler 69, a cooler bypass valve 70, and a linear solenoid valve 71, which is one element to be controlled in the present invention. The linear solenoid valve 71 is a throttle control valve capable of freely controlling hydraulic pressure. The hydraulic circuit of FIG. 7 further includes an accumulator control valve 72, a hydraulic pump 73, a pressure regulating valve 75, an accumulator 76, a check valve 77, a first solenoid valve $S_1$ for controlling the 1-2 and 3-4 shift valves 52, 53, respectively, a second solenoid valve $S_2$ for controlling the 2-3 shift valve 55 and downshift valve 57, a third solenoid valve $S_3$ for controlling the 4-5 shift valve 56, and a fourth solenoid valve $S_4$ for controlling the duty of the lock-up control valve 59.

In the five-speed automatic transmission 21, the clutches C0–C3, brakes B1–B4 and one-way clutches F0–F3 are actuated based on a combination of on and off signals applied to the first through fourth solenoids $S_1$, $S_2$, $S_3$ and $S_4$ in the hydraulic circuit 50 in each of the ranges selected by the manual valve 51, as shown in FIG. 8, whereby the transmission speeds 1st through 5th are in obtained in each of the ranges P, R, D, 3, 2 and 1.

Figure 1:
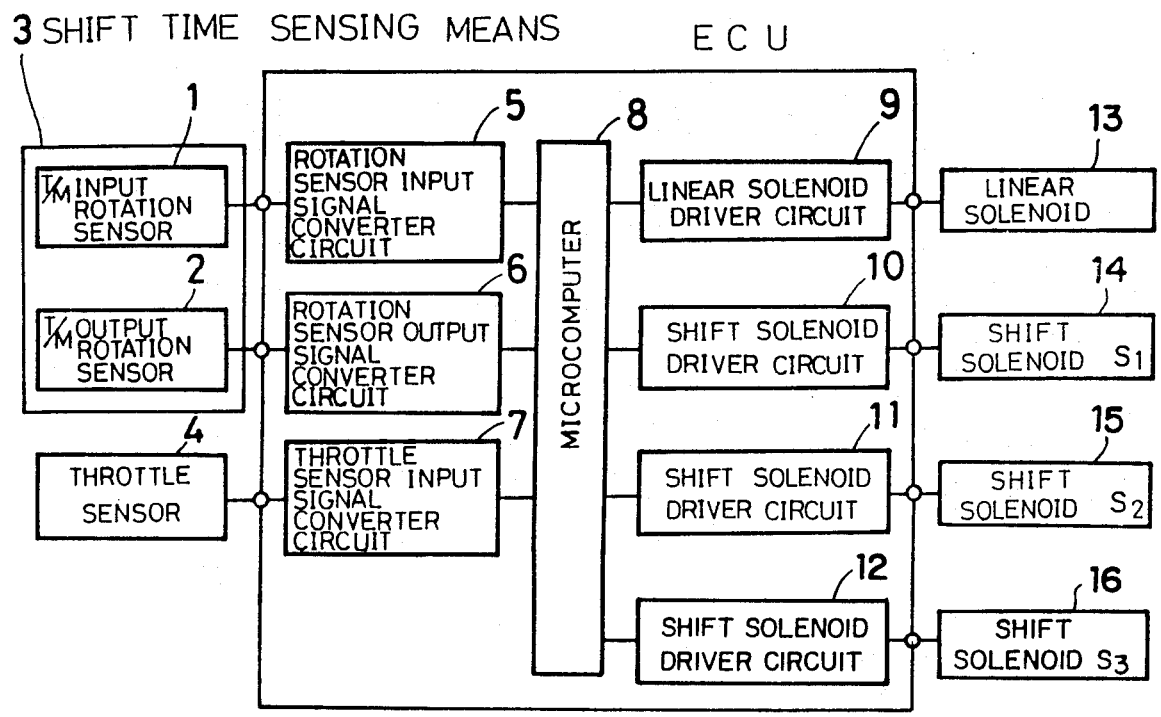
FIG. 1 is a block diagram illustrating an embodiment of a control system of an electronically controlled automatic transmission in accordance with the invention.

An embodiment of the control system of the electronically controlled automatic transmission according to the invention will now be described with reference to FIG. 1.

An input rotational speed sensor 1 and an output rotational speed sensor 2 of the automatic transmission construct shift time sensing means 3. The output signals of the sensing means 3 and the output signal of an engine throttle opening sensor 4 are inputted to a microcomputer 8 via input signal converting circuits 5, 6 and 7. The microcomputer 8 executes shift control processing, described below. Based on the results of this processing, the microcomputer 8 delivers output signals to a linear solenoid 13 via a linear solenoid driver circuit 9, and to shift solenoids 14, 15, 16 for controlling solenoid values $S_1$, $S_2$, And $S_3$ via shift solenoid driver circuits 10, 11, 12, respectively.

The linear solenoid 71 is supplied with a current proportional to the signal from the throttle sensor 3. When the displacement of the accelerator pedal is increased to enlarge the throttle opening, the plunger of the linear solenoid valve 71 shown in FIG. 7 is urge upwardly by an electromagnetic force in a direction to close an oil line "a" carrying line pressure. Throttle pressure is produced and acts upon the 1-2 shift valve 52, the 2-3 shift valve 55, the 3-4 shift valve 56. The throttle pressure also acts upon the primary regulator valve 61 and secondary regulator valve 62 through an oil line b. Thus, line pressure is regulated to a value conforming to the throttle valve opening. By regulating the flow of current to the linear solenoid 71, line pressure is varied to make possible adjustment of the friction element engagement time, namely the shifting time.

Control performed by the microcomputer 8 will now be described with reference to the flowchart of FIG. 2. The throttle opening is read in at step 101 of the flowchart, the input and output rotational speeds are read in at a step 102, a shift judgment is made at a step 103, and linear solenoid output data are set at a step 104. Next, shift time from the start to the end of a shift is calculated and a shift time comparison decision is made at a step 105. This is followed by a step 106, at which linear solenoid output data are selected on the basis of the decision rendered at the step 105.

Figure 2:
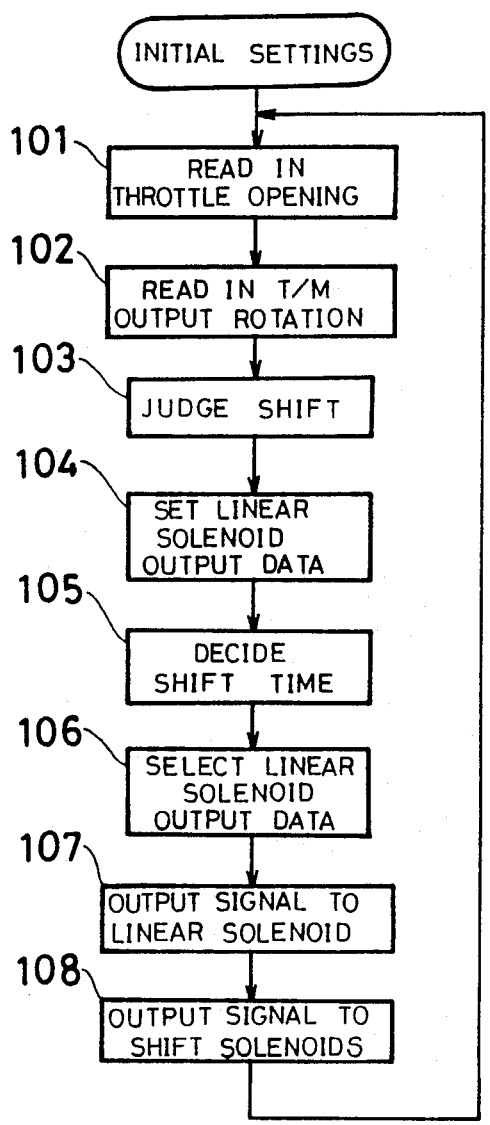
FIGS. 2, 3, 4 and 5 are views for describing the flow of processing in the control system of the invention.
Figure 3:
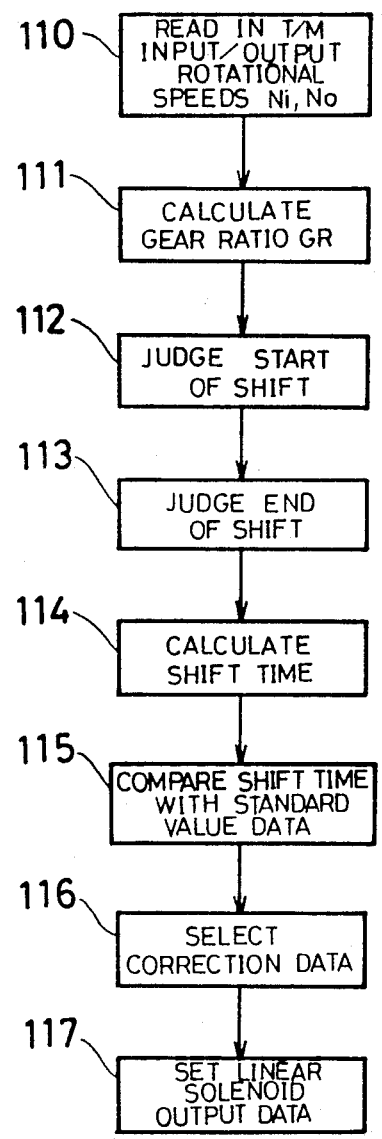
Figure 3:
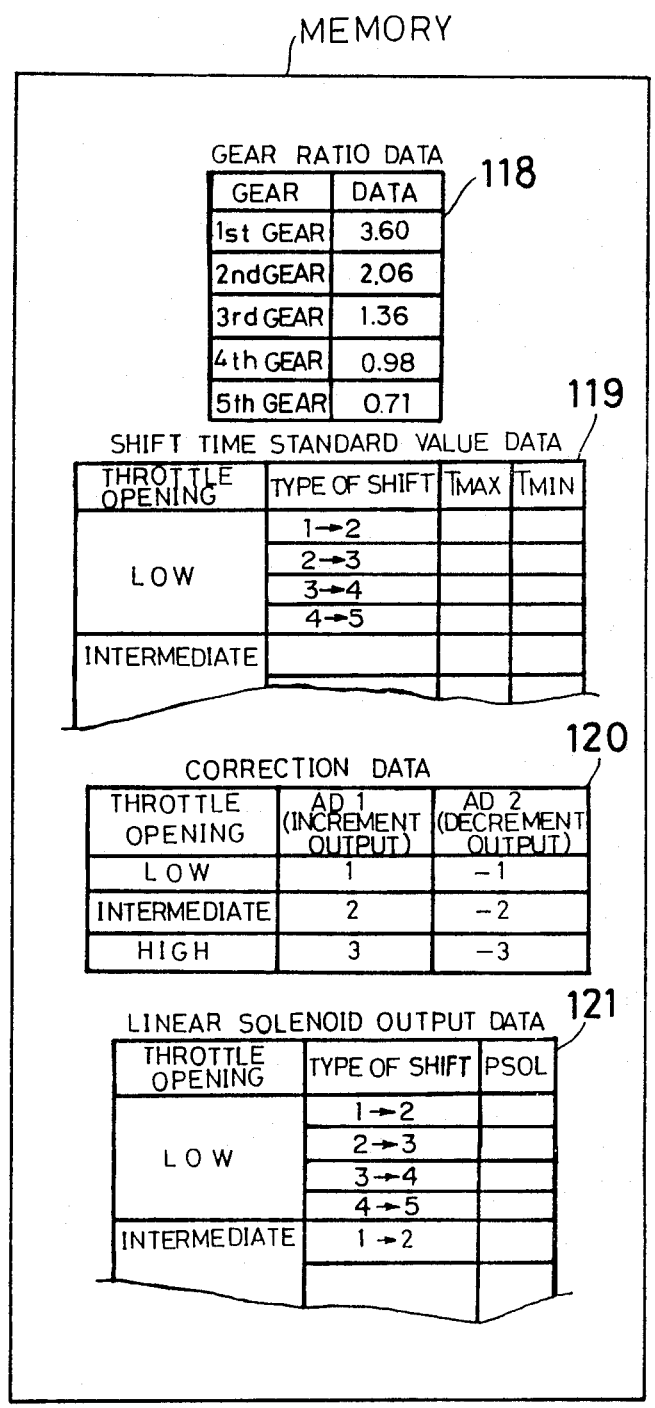

The setting of the linear solenoid output data at the step 104 in FIG. 2 is performed by a routine shown in FIG. 3 at the moment of the last shift. More specifically, an input rotational speed $N_i$ and an output rotational speed $N_o$ are read in at a step 110. The present gear ratio $GR=N_i/N_o$ is calculated at a step 111, and decisions regarding the start and end of a shift are rendered at steps 112, 113, respectively. These decisions are made on the basis of gear ratio data 118 stored in memory and are performed by comparing the gear ratios before and after a shift with the present gear ratio GR on the basis of the gear ratio data 118.

Next, shift time from the start to the end of a shift is calculated at a step 114, and the calculated shift time is compared with shift time standard value data 119, which have been stored in the memory, at a step 115. Set as the standard value data 119 on the basis of design data and traveling data are maximum and minimum values $T_{MAX}$, $T_{MIN}$ of an optimum shift time. A step 116 calls for the selection of correction data 120 for the purpose of altering the shift time on the basis of the comparison decision of step 115. This is followed by a step 117, at which a shift time, namely line pressure PSOL, is set for every throttle opening and type of shift.

Figure 4:
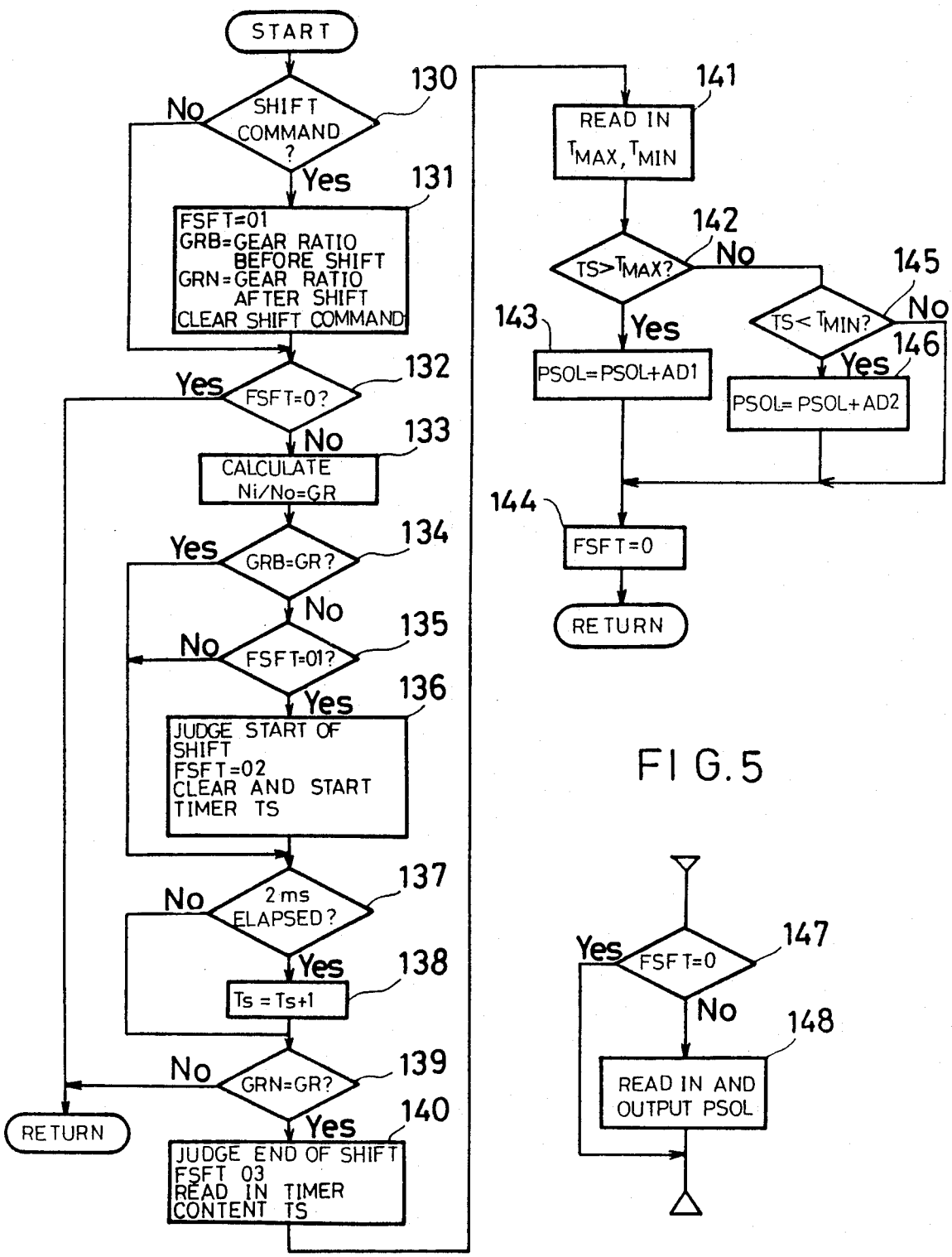

The flow of control performed by the present invention will now be described with reference to FIGS. 4 and 5. In FIG. 4, a step 130 calls for a decision based on the vehicle velocity signal and throttle signal as to whether a shift command has been issued. In the absence of a shift command, the program proceeds to a step 132. If a shift command is issued, the program proceeds to a step 131. Here a shift flag FSFT=01 is set, a rear ratio GRB before the shift and a gear ratio GRN after the shift are read in from the gear ratio data 118 (FIG. 3) in the memory, and the shift command is cleared. The step 132 calls for a decision as to whether the shift flag FSFT is 0. If the answer is YES, then the program returns; if the answer is NO, the program proceeds to a step 133, at which the present gear ratio $GR=N_i/N_o$.

Next, it is decided at a step 134 whether the present gear ratio GR is equal to the gear ratio GRB before the shift. If the answer is YES (indicating a time before the start of the shift), then the program proceeds to a step 137. If NO is the answer, then the program proceeds to a step 135, at which a decision is rendered as to whether the shift flag FSFT is 01. If the flag is not 01 (since the shift command is cleared at the step 131, FSFT will be 01 only at the beginning of processing), the program proceeds to a step 137. If the flag FSFT is found to be 01 at the step 135, a decision is rendered to the effect that a shift has begun, the shift flag FSFT is set to 02, and a timer TS is cleared and then started (step 136). The timer TS is incremented every 2 ms at steps 137 and 138.

Next, a decision is rendered at a step 139 as to whether the present gear ratio GR is equal to the gear ratio GRN after the shift. If it is not equal (indicating that a shift is in progress), the program returns and the above-described processing is repeated. When equality is attained, the program proceeds to a step 140, at which it is decided that the shift has ended, the shift flag FSFT is set to 03 and the value in the timer TS is read in. Next, the shift time standard value data 119 (FIG. 3) are read in at a step 141. Then, at a step 142, it is determined whether the shift time TS of the shift just performed is greater than the maximum value $T_{MAX}$ of the standard value data. If the result is that the shift time is longer than the standard value, the program proceeds to a step 143, at which AD1 of the correction data 120 (FIG. 3) is added to the line pressure PSOL so as to increase the same. This is followed by a step 144, at which the shift flag FSFT is made 0. If the shift time TS of the shift just performed is not greater than the maximum value $T_{MAX}$ of the standard value data at the step 142, then the program proceeds to a step 145, at which it is determined whether the shift time TS of the shift just performed is smaller than the minimum value $T_{MIN}$ of the standard value data. If the result is that the shift time is shorter than the standard value, the program proceeds to a step 146, at which AD2 of the correction data 120 (FIG. 3) is added to the line pressure PSOL so as to decrease the same. Thereafter, the shift flag FSFT is set to 0 and the above-described routine is executed repeatedly.

Figure 5:
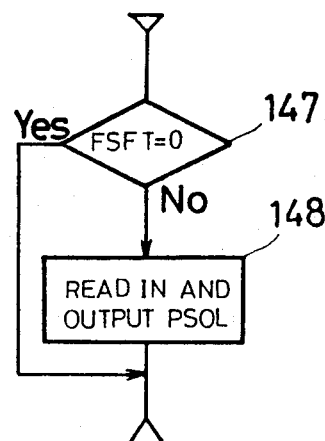

In FIG. 5, it is determined at a step 147 whether the shift flag FSFT is 0. When a shift is made (a shift command ~ shift end judgment), the line pressure PSOL calculated last in the routine of FIG. 4 is read in and outputted at a step 148. As a result, if the shift time deviates from the maximum value $T_{MAX}$ and minimum value $T_{MIN}$ of the standard value data, the linear solenoid output data are set for the purpose of altering the shift time for the shift performed on the next occasion. If TS falls within the standard values, the linear solenoid output data are kept as is. If the shift time departs from the standard values even after a correction has been performed one time, the correction is performed again in the same manner. The standard value data and the linear solenoid output data are stored in memory when required, with the throttle opening and the type of shift serving as parameters. When a shift is made (a shift command ~ shift end judgment), engagement pressure is controlled on the basis of the set linear solenoid output data, thereby automatically regulating the shift time.

It should be noted that the invention can be modified in various ways and is not limited to the foregoing embodiment.

For example, in the foregoing embodiment, a decision concerning the beginning and end of a shift is made based on whether the present gear ratio is equal to the gear ratio before or after the shift. However, it is permissible to make the decision based on whether the present gear ratio lies within an allowable error of the gear ratio before or after the shift.

In addition, the method of sensing the shift time is to compare the aforementioned gear ratios. However, the shift time can also be sensed based on a change in engine rotational speed, a change in the input rotational speed of the transmission, or a change in the output shaft torque of the transmission.

Thus, in accordance with the invention as described above, actual shift time while the vehicle is traveling is constantly fed back and controlled so as to attain an optimum shift time. Therefore, even if a change in the shift time is brought about by a change in oil temperature in the transmission or by aging of the friction elements or the like, the shift time can be corrected to an optimum value to improve shift sensation as well as the durability of the friction elements. In addition, an adjustment operation during the manufacturing process can be simplified or eliminated, thereby enabling the manufacturing costs to be reduced.

As many apparently widely different embodiments of the present invention can be made without departing from the spirit and scope thereof, it is to be understood that the invention is not limited to the specific embodiments thereof except as defined in the appended claims.

What is claimed is:

1. An electronically controlled automatic transmission comprising:
    input/output rpm detecting means for detecting input rpm and output rpm of an automatic transmission;
    gear ratio computing means for receiving a detected transmission input rpm and output rpm and for computing a gear ratio during a shift based thereon;
    time detecting means for computing a length of shift time from start to end of said shift based upon comparing gear ratios before and after said shift with said gear ratio computed by said gear ratio computing means during said shift;
    comparison means for comparing a computed length of shift time output signal from said shift time detecting means with a preset shift time standard value data; and
    line pressure correcting means for receiving an output signal from said comparison means and for correcting line pressure, said corrected line pressure being supplied to friction devices of said automatic transmission, when said output signal from said time detecting means is outside a range of said shift time standard value data.

2. The automatic transmission according to claim 1, wherein said line pressure correcting means comprises:

a linear solenoid for generating hydraulic pressure commensurate with throttle opening upon receiving a signal form a throttle opening sensor as an input thereto, and line pressure generating means for generating line pressure in dependence upon an output signal from said linear solenoid, wherein line pressure supplied to said friction devices of said automatic transmission is controlled by said linear solenoid in such a manner that said hydraulic pressure commensurate with throttle opening is revised when said output signal from said shift time detecting means is outside said range of said shift time standard value data.

3. The automatic transmission according to claim 1, wherein said shift time standard value data comprise maximum and minimum values set for every throttle opening and type of shift.

4. The automatic transmission according to claim 2, wherein said hydraulic pressure commensurate with throttle opening is revised base upon said signal received from said throttle opening sensor.

* * * * *